(12) United States Patent
Pushpavanam et al.

(10) Patent No.: US 7,296,197 B2
(45) Date of Patent: Nov. 13, 2007

(54) METADATA-FACILITATED SOFTWARE TESTING

(75) Inventors: Kaushik Pushpavanam, Sammamish, WA (US); Ujjwal Sarin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 11/051,042

(22) Filed: Feb. 4, 2005

(65) Prior Publication Data

US 2006/0179386 A1 Aug. 10, 2006

(51) Int. Cl.
*G11C 29/00* (2006.01)
*G06F 11/00* (2006.01)
*G01R 31/28* (2006.01)
*G06F 9/44* (2006.01)

(52) U.S. Cl. ........................ 714/722; 714/38; 714/718; 714/738; 717/124

(58) Field of Classification Search ...................... None
See application file for complete search history.

(56) References Cited

U.S. PATENT DOCUMENTS

| 4,497,301 | A  | * | 2/1985  | Inoue et al. ................. 123/486 |
| 6,859,922 | B1 | * | 2/2005  | Baker et al. ................. 717/125 |
| 6,966,053 | B2 | * | 11/2005 | Paris et al. .................. 717/143 |
| 7,194,730 | B2 | * | 3/2007  | Pramberger .................. 717/120 |
| 2005/0229159 | A1 | * | 10/2005 | Haba et al. ................. 717/122 |
| 2006/0218453 | A1 | * | 9/2006  | Crump et al. ............... 714/718 |

\* cited by examiner

*Primary Examiner*—Phung My Chung
(74) *Attorney, Agent, or Firm*—Lee & Hayes, PLLC (57) ABSTRACT

Described herein are one or more implementations for facilitation of computer software testing. One or more implementations, described herein, determine logical type of one or more test input-parameters based upon metadata placed on a function under test (FUT) of software. Using that determined logical type, an implementation generates data values. In some instances, those generated values are values selected from a repository of data values with associated logical types. The selection is based upon the determined logical type. After generating data values for testing the FUT, an implementation supplies the generated data values as input to the FUT.

20 Claims, 5 Drawing Sheets

*Fig. 1*
*(background)*

METADATA-FACILITATED SOFTWARE TESTING

TECHNICAL FIELD

This invention generally relates to a technology facilitating the automated testing of computer software.

BACKGROUND

Software testing is a process used to improve quality of developed computer software by detecting defects. In its simplest form, software testing tests at least one specific function of a software product under test. Herein, a "function" is an executable portion (e.g., program module, subroutine, procedure, etc.) of a software product that uses input parameters to produce an observable result. For the sake of brevity, a specific "function under test" is called FUT herein.

Typically, software testing involves devising a set of input values for a FUT that will cause the FUT to exercise all or some of its computer-executable instructions. A tester verifies that the results produced by the test of the FUT are in accord with predefined expectations. Many different conventional testing approaches exist, and they range from informal and manual ad hoc testing to formal, controlled, and automated testing.

Figure 1:
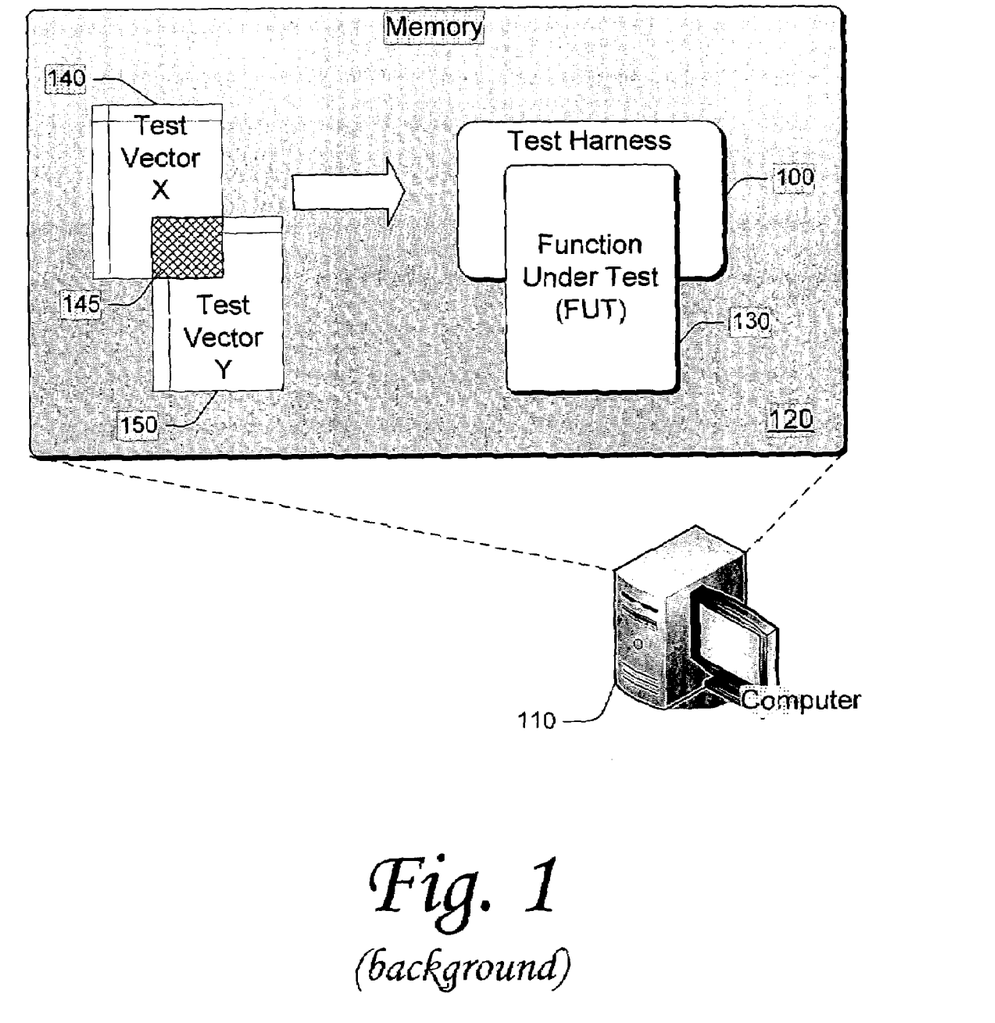
FIG. 1 shows an example of a traditional software-testing scenario.

A major tool in the tester's toolbox is a "test harness." FIG. 1 shows an example of a test harness 100 in a conventional software-testing scenario. FIG. 1 also shows a typical computer 110 having a primary memory 120 (e.g., volatile or non-volatile memory). This computer may be a general- or special-purpose computer in this illustrated traditional scenario. Running in this memory is the software product being tested. One function of the software product—the function being the focus of this exemplary scenario—is represented by Function Under Test (FUT) 130. For the sake of clarity, FIG. 1 shows only one function under test (e.g., FUT 130); however, FUT 130 may represent one or more functions being tested (concurrently or serially).

The test harness 100 operates in the memory 120 with the FUT 130 and, as illustrated in FIG. 1, "saddles" or operates with some degree of control over the FUT. Rather than receiving input as it normally would (e.g., input from a user-interface or from another function), the FUT 130 receives input from the test harhess 100. Also, rather than providing output as it normally would (e.g., output to a user-interface or to another function), the FUT 130 sends the output to the test harness 100. Conventional test harness technology (like test harness 100) is known to those of ordinary skill in the art of software testing.

Conventionally, the test harness 100 includes the logic for acquiring the input values for testing, logic for interacting with the FUT 130, and logic for acquiring the results of the test. Typically, the test harness 100 also includes logic for analyzing the results to determine if the actual results match the expected results. Conventionally, the logic of a test harness is typically custom written and is inextricably intertwined with the test values, which are expected to be used to test the FUT.

As shown in FIG. 1, the illustrated combination of the test harness 100 and the FUT 130 represents a specific and exemplary scenario under which the FUT is tested. Each different specific scenario is called a "test-case." A test-case is defined by the FUT being tested, its testing logic, and specific combinations and/or permutations of input parameters being tested.

An example of a conventional test-case is represented by the following definition:

TABLE 1

[PriorityOne]
public void TestCaseNonParameterized( )
{
string commandToExecute =
"base-string" + "test-string";
bool expectedResult = true;
bool ignoreCase = true;
ExecuteTest
(commandToExecute, expectedResult, ignoreCase);
}

An exemplary conventional test-case named "TestCaseNonParameterized" is shown in Table 1. The testing logic is represented by the label "ExecuteTest."

The actual input-parameter values for each test-case are provided by one or more test vector(s). A typical test vector is a file or data structure. While a test-case defines the testing conditions, the test vector supplies the actual input-parameter values for testing the FUT under the defined testing conditions of the test-case.

To illustrate, consider this example that tests functions of a "numeric calculator" software program:
  Test-case: Testing "addition" function with input being two integers
  Test Vector: Vector 1: Add 2+3; result should be 5 Vector 2: Add −1+4; result should be 3
  Test-case: Testing "multiplication" function with input being at least one negative integer
  Test Vector: Vector 1: Multiply 0*−4, result should be 0 Vector 2: Multiply −2*−4, result should be 8 Vector 3: Multiply −1*−1, result should be 1

Effective testing of a FUT typically covers one or more test-cases and each test-case uses one or more rich test vectors. The set of values of a rich test vector typically includes a broad spectrum of plausible combinations and permutations of values for input parameters.

In the example shown in Table 1, the test-vector source (e.g., a file) is identified as being at a location specified in the test-case definition. Specifically, that location is "test-string" in this example. So, the input-parameter values for the FUT of this test-case are provided at the specified location of "test-string."

FIG. 1 shows two exemplary test vectors: X 140 and Y 150, respectively. The values of test vectors may be supplied via manual data-entry or automatic generation. Regardless, these test vectors X and Y are a list of values stored in a datasource (e.g., file, data structure, or database). For example, the values in test vector X 140 may include a list of positive integers for an exemplary "addition" function test case, and the values in test vector Y 150 may include a list of some positive and some negative integers for an exemplary "multiplication" function test case.

A crosshatch area 145 represents values shared between the exemplary text vectors X and Y. For example, the crosshatch area may represent a set of shared positive integers that applies to test-cases for both the exemplary "addition" and "multiplication" functions. This sharing of values between test vectors may be accomplished numerous ways. For example, sharing may be accomplished via literal copying of data between vectors or via a cross-reference of common values.

For a particular test-case of the FUT 130 where the test-case is associated with test vector X 140, the test harness 100 acquires the values to be tested from test vector X. To test the FUT 130, the test harness 100 provides these acquired values to the FUT and analyzes the FUT's results to determine if the actual results match the expected results.

In the setting of formal, controlled, and automated testing (in which a test harness is typically used), a tester typically custom writes a test-case for each different FUT, each different combination and/or permutation of input parameters, and each contemplated test vector. Conventionally, the custom-written testing logic of each test-case is tightly intertwined with the input parameters that characterize the test-case. Moreover, the contents of test vector(s) are traditionally narrowly tailored to their associated test-case(s). Consequently, test-cases are typically rigidly defined and unable to adapt to new or updated test vectors.

The scope of testing increases, not only because of issues related to rigidity and inflexibility, but, also, because the number of possible defects in the FUT and the number of configurations of the FUT increases dramatically relative to the increase in the size and complexity of the FUT. Therefore, an effective test vector for a FUT may be quite large. Not only may the test vector be large, but it is also likely to grow, change, and evolve during the testing lifecycle of the FUT.

SUMMARY

Described herein are one or more implementations for facilitation of computer software testing. One or more implementations, described herein, determine logical type of one or more test input-parameters based upon metadata placed on a function under test (FUT) of software. Using that determined logical type, an implementation generates data values. In some instances, those generated values are selected from a repository of data values with associated logical types. The selection is based upon the determined logical type. After generating data values for testing the FUT, an implementation supplies the generated data values as input to the FUT.

DESCRIPTION OF THE DRAWINGS

The same numbers are used throughout the drawings to reference like elements and features.

DETAILED DESCRIPTION

The following description sets forth techniques facilitating the testing of computer software. These techniques offer flexibility within the setting of formal, controlled, and automated testing of computer software. These techniques employ a paradigm for self-describing test-cases (using metadata) and an infrastructural design for establishing and maintaining a repository of common input-parameter test values. This repository of test values is easily shared amongst many parties who may update, add, change, remove, and modify the data values in the repository.

Test vector sets for each test-case typically evolve and grow over the testing lifecycle of a software product. In addition, new test vectors are introduced during a product's testing lifecycle. The techniques described herein provide for smooth adaptation to updated test vectors and adoption of new test vectors for existing test cases.

Exemplary Metadata-Facilitated Software Testing Environment

Figure 2:
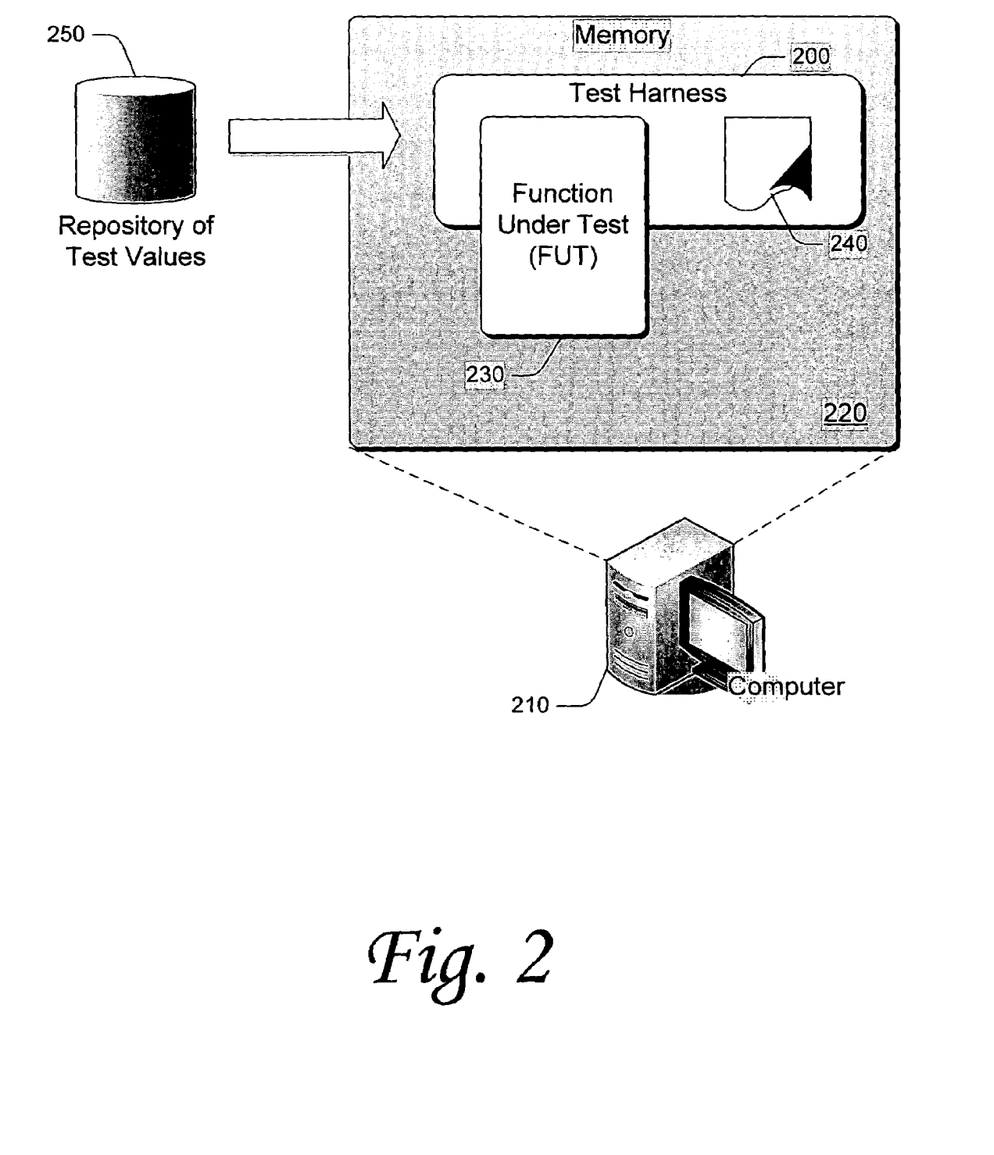
FIG. 2 an example of a software-testing scenario in accordance with at least one implementation described herein.
Figure 5:
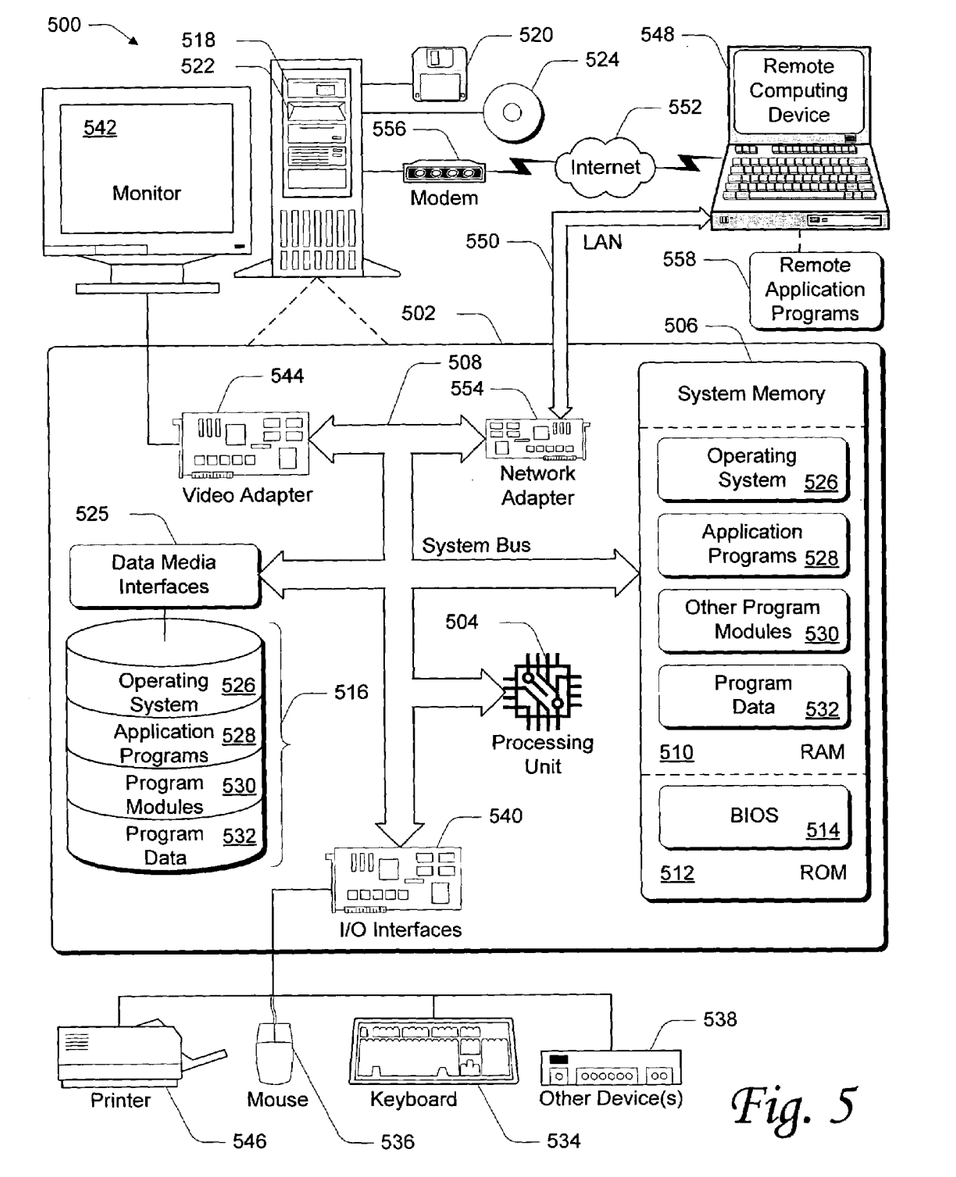
FIG. 5 is an example of a computing operating environment capable of (wholly or partially) implementing at least one embodiment described herein.

FIG. 2 illustrates an implementation of an exemplary test harness 200, as described herein, for testing of software in a manner that is facilitated by the use of metadata. The harness itself is, for example, a program module executing on a computer system (such as is depicted in FIG. 5) that provides a new paradigm for formal, controlled, and automated testing of a software product that typically is executing on the same computer system. This new paradigm solves the problem of rigid test-cases by separating the test-case logic from the test-case values (i.e., test vector).

FIG. 2 illustrates, at a high-level, the test harness 200 in an exemplary software-testing scenario. The figure illustrates a typical computer 210 having a primary memory 220 (e.g., volatile or non-volatile memory). This computer may be a general- or special-purpose computer in this illustrated scenario.

Running in this memory with the test harness 200 is the software product being tested. One function of the software product in this exemplary scenario is represented by Function Under Test (FUT) 230. For the sake of clarity, FIG. 2 shows only one function under test (e.g., FUT 230); however, FUT 230 may represent one or more function being tested (concurrently or serially).

As shown in FIG. 2, the illustrated combination of the test harness 200 and the FUT 230 represents a specific and exemplary test-case. This test-case defines the FUT, specific combinations and/or permutations of input parameters being tested, and the testing logic tested.

Using a conventional paradigm, the contents and interfaces of each test-case are typically customized and narrowly tailored to the specifics of that test-case. For example, as shown in Table 1, the testing logic of a conventional test-case is typically custom designed for the particulars of that test-case.

In contrast, the contents and interfaces of each test-case in the new paradigm described herein are generalized and are at least one level of abstraction above the low-level details. More particularly, test-case metadata (such as test-case metadata test-case 240 in FIG. 2) specifies "logical types" for the input parameters rather than defining the input parameters specifically and/or linking to specific test vectors. A logical type is a higher-level description or name of a value stored in a native type (e.g., int, bool, float). Examples of logical types may have names like "Machine-Name," "ProcessId," "ValidPathString," "ExcludeFilter," and "Regular Expression."

FIG. 2 also shows a repository 250 of test values. The repository may be a secondary storage device (e.g., hard drive, flash memory, CD-ROM, DVD-ROM, etc.) or it may be a primary memory system (e.g., RAM) of a computer (e.g., computer 210). In this repository, each test value has a logical type associated therewith. The type of a value may also be specified in logic instructions or in grammar.

During a software product's testing lifecycle, the set of desirable test values changes in response to the natural evolution and growth during that lifecycle. Using the conventional approaches, the tester would probably need to re-write the customized test-cases to account for such changes. However, using the techniques described herein, the tester needs only to update (e.g., additions, deletions, and modifications) the test values in the repository 250 to account for such changes. A new test vector (using the updated values) will be dynamically generated the next time the test-case is tested.

Rather than extracting test values from a statically defined test vector (as the conventional approach does), the test harness 200 dynamically generates an instance of a test vector from the repository 250 of test values. The test harness 200 processes a test-case's self-describing metadata definition (e.g., test-case metadata 240). In doing so, the harness determines which logical types the test-cases utilize.

For example, assume that a function called "AddTwoIntegers" is being tested. So, it is the FUT. The logical type of the FUT is "Integer:PositiveInteger:PositiveEvenInteger." The repository 250 of test values may include a listing for PositiveInteger test values that includes, for example, "1, 2, 3, 4, 5, 10, 11" and a listing for PositiveEvenInteger test values that includes, for example, "2, 4, 10."

In one implementation, the harness performs a "reflection" on the repository 250. A "reflection" involves the harness querying the repository 250 to find test values of the determined types. The repository responds to the harness with values of that type.

In another implementation, the harness defines an "equivalence class" of data values in the repository 250. The equivalence class definition is based upon the determined types. The repository responds with values, which are part of the defined equivalence class.

An "equivalence class" is a class of elements that are treated as equivalents. More particularly, the FUT may operate on all data values, which are members of the same equivalence class. Using the determined types specified in the test-case definition and the specified types associated with values in the repository 250, the harness defines an equivalence class of data values in the repository. The repository supplies the values of the defined equivalence class to the harness.

An example of a test-case is represented by the following definition, which include metadata tags (e.g., using .NET™ attributes):

TABLE 2

[PriorityOne]
[ParameterGenerator(typeof(StringGenerator))]
public void TestCaseParametrized
(String ValidTestString)
{
   string   commandToExecute  =  "base-string"  + ValidStringValue;
   bool expectedResult = true;
   bool ignoreCase = true;
   ExecuteTest
   (commandToExecute, expectedResult, ignoreCase);
}

ExecuteTest is the testing logic for the TestCaseParametrized test-case of Table 2. ParameterGenerator is a metadata tag in the test-case definition that describes the TestCaseParametrized test-case. Rather than identifying an actual source of test values in the test-case definition (as a conventional test-case definition might do), this self-describing test-case specifies the "logical type."

At runtime of the test-case, the ParameterGenerator attribute is reflected (based upon a repository of input values) and the results of that reflection are used to generate values for the parameters of the TestCaseParametrized test-case. A "generator" is used to generate the actual values of a logical type of an input parameter. In Table 2, the test-case specifies that StringGenerator as generating the specific values in the input parameter's equivalence class.

Operation of Test Harness

Figure 3:
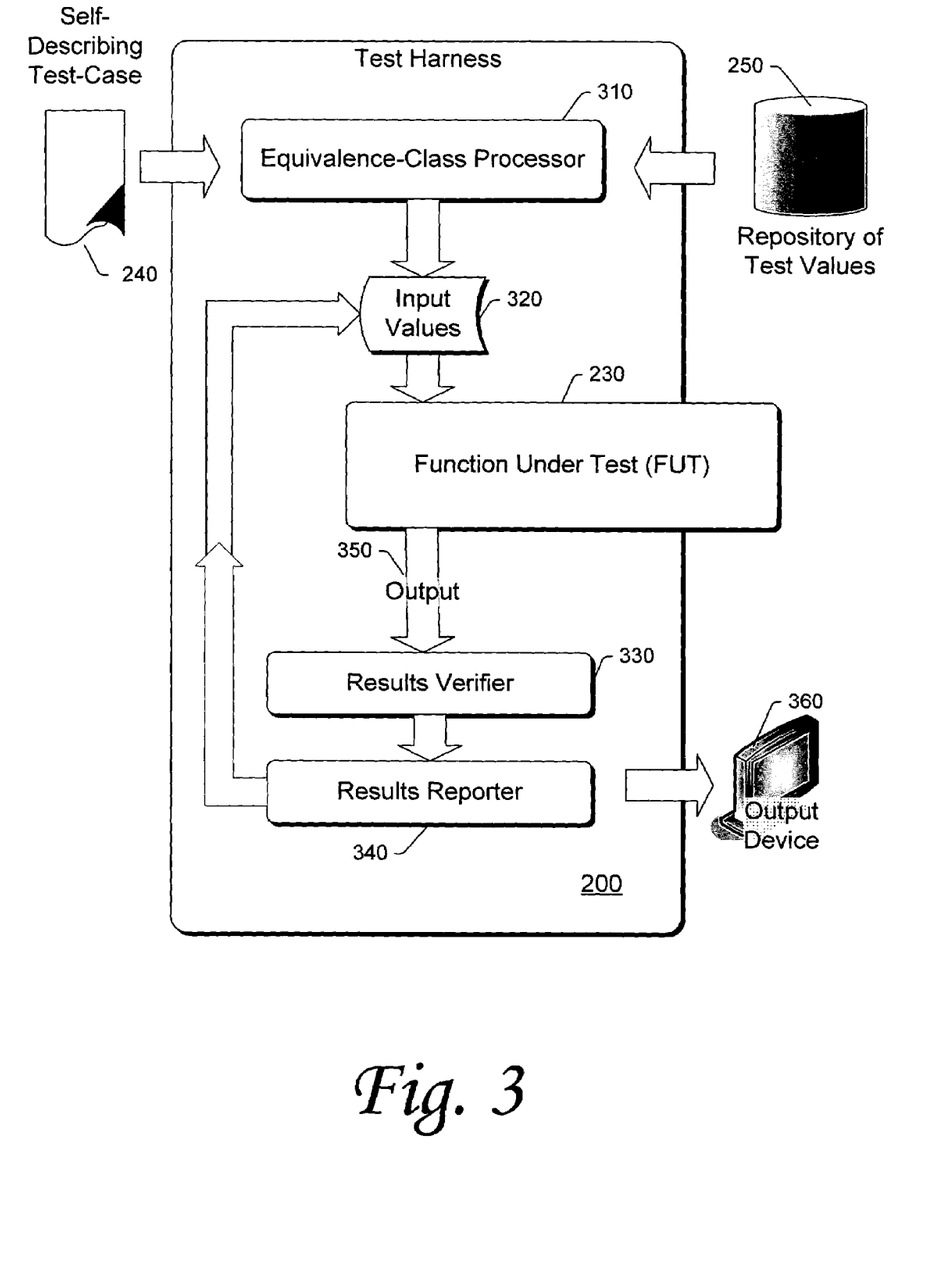
FIG. 3 shows operational components of an exemplary test harness in accordance with at least one implementation described herein.

FIG. 3 illustrates operational details of the test harness 200. Because this is the same test harness 200 discussed in reference to FIG. 2, the test-harness shown in FIG. 3 retains the 200 reference designator. Similarly, the self-describing test-case definition 240, the repository 250, and the FUT 230 retain their original reference designators from the previous figure. Although the operational components of FIG. 3 are shown as being part of the test harness 200, those of ordinary skill in the art understand the each operational component and sub-component may be incorporated into one or more entities other than the test harness.

As shown in FIG. 3, the test harness 200 has an equivalence-class processor 310, an input-values storage location 320, a results verifier 330, and a results reporter 340. The FUT 230 generates an output 350, which may be persisted by the harness. An output device 360 handles the outcome reported by the results reporter 340.

The equivalence-class processor 310 reads and analyzes the self-describing test-case definition 240. Based upon the metadata in the self-describing test-case definition 240, the processor 310 determines the one or more logical types of the specified input parameters. Since the harness treats all values of a specified logical type as equivalent, the processor has effectively determined the one or more equivalence classes of the input parameters of the test-case.

Once the processor 310 determines the one or more equivalence classes, the processor queries the repository 250 to find test values of that type. The repository supplies values of that type to the processor 310. Effectively, the processor is dynamically generating or producing an instance of a test vector from the repository 250. This dynamically generated test vector includes test values that are selected because their associated logical type matches the determined test input-parameter logical type.

Before producing the input values of a defined equivalence class based upon a logical type, the processor defines an equivalence class from which the input values are drawn. Those of ordinary skill in the art are aware of existing techniques for defining an equivalence class of members of a given, based upon equivalence relationship amongst the members of the set. To define an equivalence class, the processor 310 may use any of these existing techniques known to those of ordinary skill in the art.

Furthermore, one or more implementations described herein utilize a schema for defining an equivalence class based upon a given logical type. More particularly, the scheme defines a relationship amongst all known logical types in accordance with a hierarchy (i.e., a "tree") of logical types. Once a logical type is located in the hierarchy, all siblings below that type are considered part of that type's equivalence class.

For example, consider the logical type of String:Language:English in the example hierarchy of Table 3 below:

TABLE 3

As shown in Table 3, English is shown under Language and String in the hierarchy. That corresponds to the specified logical type of String:Language:English. Since US, British, and SouthAfrican are siblings of String:Language:English, they are considered to be part of the equivalence class specified by String:Language:English. The data values associated with these siblings will be included in a dynamically generated set of input values based upon a determined logical type of String:Language:English.

After determining equivalence classes and generating test values for those equivalence classes, the processor 310 supplies dynamically generated test values as input to the FUT 230. Especially when multiple values are supplied to the FUT concurrently, the processor may supply the values directly to the FUT. Alternatively, the processor may also persist the dynamically generated test values into memory, such as input value storage location 320. This way, the values may be supplied to the FUT in a serial fashion (e.g., one-at-a-time or a set-at-a-time).

Upon completion of its operations, the FUT 230 produces output 330. In the alternative and/or in addition, the FUT may produce an external effect. For example, a function designed to delete a file may not generate an output per se. Instead, the function operates on a file to remove it. The function produces an external effect.

The results verifier 330 observes the output (or effect) of the FUT and the verifier compares that to expected results. The verifier may determine the expected results. Since the determination of the expected results is probably dependent upon the actual input values, the verifier may also receive the input values from the storage location 320. In addition, the expected results will typically be supplied by the test-case definition 240.

In a conventional testing approach, the determination of the expected results each time the FUT is tested are typically narrowly proscribed by the specific and statically created test vectors. However, using the techniques described herein, the determination of the expected results each time the FUT is tested is not affected by actual values used. That is because the values of each logical type are considered part of an equivalence class. Therefore, how the expected results are determined is invariant.

The results reporter 340 reports the results of the report verifier to the output device 360. The output device may be, for example, a computer monitor, a printer, database, a communications medium, or other data storage system. Furthermore, the function of the test harness 200 may return to the processor 310 for the processor to supply additional test values as input to the FUT 230. The harness may repeat this functional loop until all the dynamically generated test values have been tested or aborted. Since the test values have already been generated, no more values need to be generated each time the functionality returns to supplying the FUT with test values.

Methodological Implementation

Figure 4:
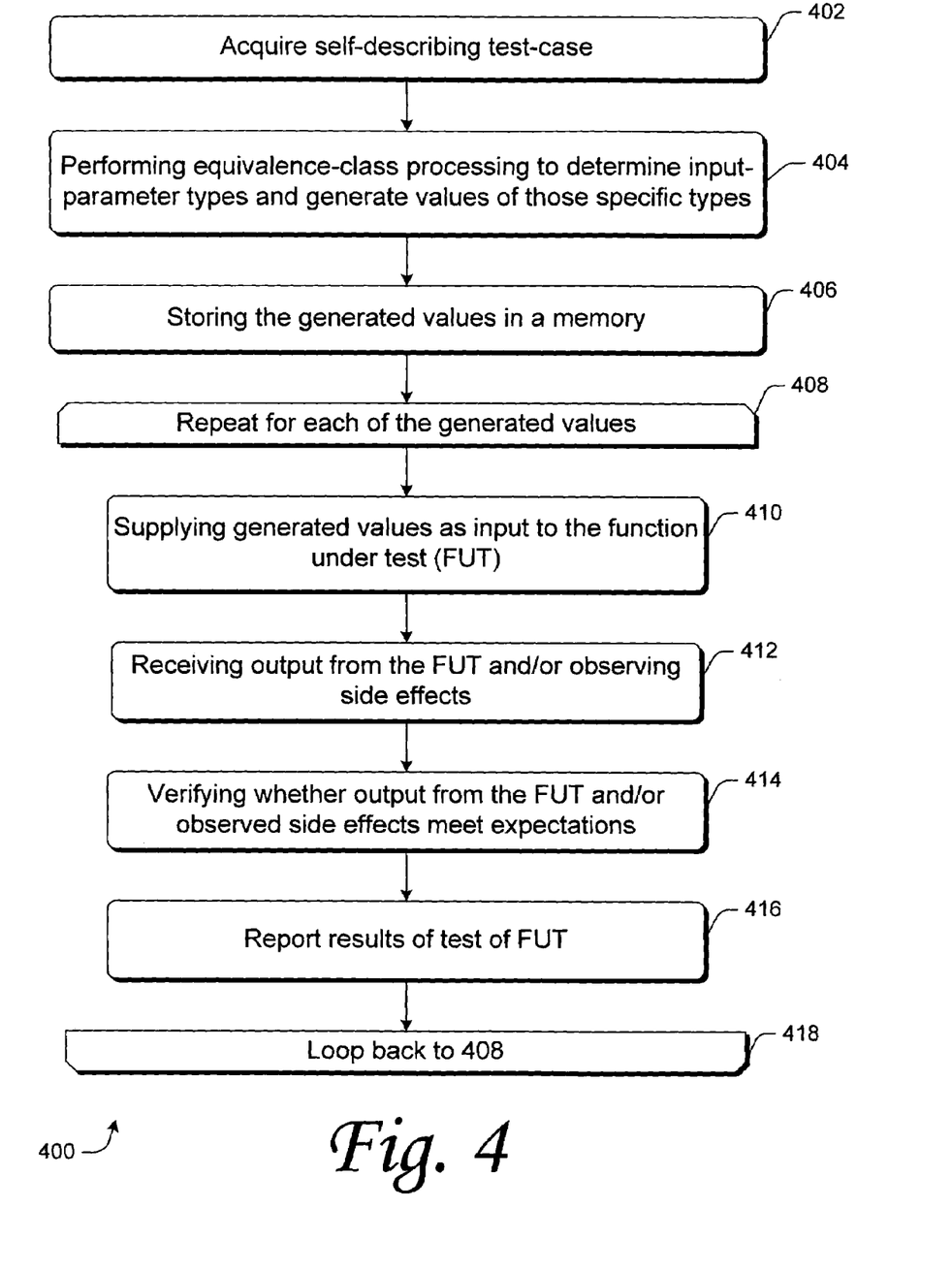
FIG. 4 illustrates a flow diagram showing a methodological implementation described herein.

FIG. 4 shows a method 400 performed by the test harness 200. This methodological implementation may be performed in software, hardware, or a combination thereof For ease of understanding, the method is delineated as separate steps represented as independent blocks in FIG. 4; however, these separately delineated steps should not be construed as necessarily order dependent in their performance. Additionally, for discussion purposes, the method 400 is described with reference to FIG. 2.

At 402 of FIG. 4, the test harness 200 acquires a self-describing test-case definition (e.g., definition 240). The test-case definition includes metadata describing logical types for input parameters.

At 404, the harness performs equivalence-class processing. The harness determines the input-parameter logical types specified by the acquired self-describing test-case. Based upon those specified types, the harness generates input values from a repository of test values (e.g., repository 250). In generating the test values, the harness determines an "equivalence class" representative of the specified logical types and provides values associated with that equivalence class from the repository.

At 406, the harness stores the dynamically generated input values into a storage location (e.g., in memory).

Blocks 408 through 418 of FIG. 4 form a loop that the test harness repeats for each member (or set of members) in the set of dynamically generated input values. This way, the FUT will be tested with each value in the set of dynamically generated test values.

At 410, the harness supplies, as input, one or more of the values of the set of dynamically generated input values to the FUT. The FUT executes based upon that input and the FUT produces a result or has an external effect.

At 412, the harness observes the resulting output from the FUT and/or the external effect produced by the FUT.

At 414, the harness verifies whether the output (and/or the effect) meets expectations. As part of this, the harness may calculate or determine the expected results based upon the subject input that the FUT received.

At 416, the harness reports the results of the test of the FUT. Typically, the results are reported via an output device and using a user-interface. Alternatively, the results may be reported only after all members of the set of dynamically generated input values have been tested.

If members (or set of members) in the set of dynamically generated input values remain untested, then the process loops at 418 back to 408 to repeat blocks 408 through 418 again for another member (or set of members). If all members are processed, then this process ends.

Exemplary Computing System and Environment

FIG. 5 illustrates an example of a suitable computing environment 500 within which an exemplary test harness, such as test harness 200 as described herein, may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The exemplary test harness may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary test harness may be described in the general context of computer-executable instructions, such as program modules, being executed by a computer. Generally, program modules include routines, programs, objects, components, data structures, etc. that perform particular tasks or implement particular abstract data types. The exemplary test harness may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing device in the form of a computer 502. The components of computer 502 may include, but are not limited to, one or more processors or processing units 504, a system memory 506, and a system bus 508 that couples various system components, including the processor 504, to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 502 typically includes a variety of computer-readable media. Such media may be any available media that is accessible by computer 502 and includes both volatile and non-volatile media, removable and non-removable media.

The system memory 506 includes computer-readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 525. Alternatively, the hard disk drive 516, magnetic disk drive 518, and optical disk drive 522 may be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 516, magnetic disk 520, optical disk 524, ROM 512, and/or RAM 510, including, by way of example, an operating system 526, one or more application programs 528, other program modules 530, and program data 532.

A user may enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device may also be connected to the system bus 508 via an interface, such as a video adapter 544. In addition to the monitor 542, other output peripheral devices may include components, such as speakers (not shown) and a printer 546, which may be connected to computer 502 via the input/output interfaces 540.

Computer 502 may operate in a networked environment using logical connections to one or more remote computers, such as a remote computing device 548. By way of example, the remote computing device 548 may be a personal computer, a portable computer, a server, a router, a network computer, a peer device or other common network node, and the like. The remote computing device 548 is illustrated as a portable computer that may include many or all of the elements and features described herein, relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. Such networking environments may be wired or wireless.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which may be internal or external to computer 502, may be connected to the system bus 508 via the input/output interfaces 540 or other appropriate mechanisms. It is to be appreciated that the illustrated network connections are exemplary and that other means of establishing communication link(s) between the computers 502 and 548 may be employed.

In a networked environment, such as that illustrated with computing environment 500, program modules depicted, relative to the computer 502 or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computing device 502 and are executed by the data processor(s) of the computer.

Computer-Executable Instructions

An implementation of an exemplary test harness may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 500 in which an exemplary test harness may be implemented. Specifically, the exemplary test harness(s) described herein may be implemented (wholly or in part) by any program modules 528-530 and/or operating system 526 in FIG. 5 or a portion thereof.

The operating environment is only an example of a suitable operating environment and is not intended to suggest any limitation as to the scope or use of functionality of the exemplary test harness(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Computer-Readable Media

An implementation of an exemplary test harness may be stored on or transmitted across some form of computer-readable media. Computer-readable media may be any available media that may be accessed by a computer. By way of example, computer-readable media may comprise, but is not limited to, "computer storage media" and "communications media."

"Computer storage media" include volatile and non-volatile, and removable and non-removable media, implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media.

CONCLUSION

The techniques may be implemented in many ways, including (but not limited to) program modules, general- and special-purpose computing systems, network servers and equipment, dedicated electronics and hardware, and as part of one or more computer networks. The techniques may, for example, be implemented on a computer system depicted in FIG. 5.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method facilitating automated testing of software, the method comprising the acts of:
   determining logical type of one or more test input-parameters based upon metadata placed on a function under test (FUT) of software;
   generating data values based upon the determined logical type of one or more test input-parameters;
   supplying the generated data values as input to the FUT.

2. A method as recited in claim 1, wherein the generating act comprises dynamically generating a test vector of data values for testing the FUT.

3. A method as recited in claim 1, wherein the generating act comprises selecting data values from a repository of data values.

4. A method as recited in claim 1, wherein the generating act comprises:

defining an equivalence class of logical types of test input-parameters based upon the determined logical type of one or more test input-parameters;

selecting data values from a repository of data values, wherein the selected data values are members of the defined equivalence class.

5. A method as recited in claim 1, wherein the supplying act supplies the generated data values as input to the FUT one at a time.

6. A method as recited in claim 1 further comprising acquiring a self-describing test-case that includes the metadata placed on the FUT.

7. A method as recited in claim 1 further comprising persisting the generated data values.

8. A method as recited in claim 1 further comprising observing effects of actions performed by the FUT after one or more of the generated data values has been supplied as input to the FUT.

9. A method as recited in claim 1 further comprising receiving output from the FUT after one or more of the generated data values has been supplied as input to the FUT.

10. A method as recited in claim 9 further comprising verifying whether the output from the FUT meets expected output when one or more of the generated data values has been supplied as input to the FUT.

11. A method as recited in claim 10 further comprising reporting results of the verifying act.

12. A method facilitating automated testing of software, the method comprising the acts of:
 determining logical type of one or more test input-parameters based upon a self-describing test-case associating with a function under test (FUT) of software;
 defining an equivalence class of logical types of test input-parameters based upon the determined logical type of one or more test input-parameters;
 selecting data values from a repository of data values, wherein the selected data values are members of the defined equivalence class;
 supplying the selected data values as input to the FUT.

13. A method as recited in claim 12, wherein the supplying act supplies the generated data values as input to the FUT one at a time.

14. A method as recited in claim 12 further comprising acquiring a self-describing test-case that includes the metadata placed on the FUT.

15. A method as recited in claim 12 further comprising persisting the selected data values.

16. A method as recited in claim 12 further comprising observing effects of actions performed by the FUT after the FUT has been supplied one or more of the selected data values as input to the FUT.

17. A method as recited in claim 12 further comprising receiving output from the FUT after the FUT has supplied one or more of the generated data values as input to the FUT.

18. A method as recited in claim 17 further comprising verifying whether the output from the FUT meets expected output when the FUT has been supplied one or more of the generated data values as input to the FUT.

19. A method as recited in claim 18 further comprising reporting results of the verifying act.

20. One or more computer-readable media having computer-executable instructions thereon that, when executed by a computer, perform a method comprising the acts of:
 determining logical type of one or more test input-parameters based upon metadata placed on a function under test (FUT) of software;
 generating data values based upon the determined logical type of one or more test input-parameters;
 supplying the generated data values as input to the FUT.

* * * * *